United States Patent [19]

Donohue et al.

[11] 4,289,870

[45] Sep. 15, 1981

[54] 2,2',6,6'-TETRAMETHYLBIPHENYL-4,4'-DIOL POLYESTERS

[75] Inventors: John A. Donohue, Elmhurst; Edward E. Paschke, Wheaton, both of Ill.

[73] Assignee: Standard Oil Company (Indiana), Chicago, Ill.

[21] Appl. No.: 81,341

[22] Filed: Oct. 3, 1979

[51] Int. Cl.$^3$ .................. C08G 63/16; C08G 63/18; C08G 63/20; C08G 63/40
[52] U.S. Cl. ............................ 528/193; 260/33.4 P; 528/176; 528/192; 528/194; 528/195
[58] Field of Search ............... 528/193, 194, 155, 176

[56] References Cited

U.S. PATENT DOCUMENTS

| | | | |
|---|---|---|---|
| 2,739,035 | 6/1978 | Webb | 260/619 A |
| 3,246,067 | 4/1966 | Boyer | 264/203 |
| 4,035,342 | 7/1977 | Paschke | 528/302 |
| 4,067,850 | 1/1978 | Kohler et al. | 528/176 |
| 4,123,454 | 10/1978 | Buxbaum | 528/194 |

*Primary Examiner*—Howard E. Schain
*Attorney, Agent, or Firm*—William H. Magidson; William T. McClain

[57] ABSTRACT

A polyester comprising units of a dicarboxylic acid component and dihydroxy component wherein said dicarboxylic acid component comprises non-vicinal benzene dicarboxylate moieties and said dihydroxy component comprises 2,2',6,6'-tetramethylbiphenyl-4,4'-diol moieties.

13 Claims, No Drawings

2,2',6,6'-TETRAMETHYLBIPHENYL-4,4'-DIOL POLYESTERS

This invention relates to polyesters comprising units of a dicarboxylic acid component and dihydroxy component comprising 2,2',6,6'-tetramethylbiphenyl-4,4'-diol moieties. More particularly, this invention relates to essentially linear polyesters comprising units of a dicarboxylate component comprising terephthalate moieties and dihydroxy components comprising 2,2',6,6'-tetramethylbiphenyl-4,4'-diol and ethylene glycol moieties.

In commonly assigned U.S. Pat. No. 4,035,342 to Paschke there is described a series of essentially linear co-polyesters comprising units of a polyhydric alcohol component comprising at least one dihydric alcohol moiety and dicarboxylate component wherein said dicarboxylate component comprises a terephthalate moieties and 2,2',6,6'-tetramethylbiphenyl-4,4'-dicarboxylate moieties. This patent points out that unlike other co-monomers added to polyethylene terephthalate, the incorporation of 2,2',6,6'-tetramethylbiphenyl-4,4'-dicarboxylate reduces the melting point of the polymer and increases the glass transition temperature of the polyethylene terephthalate in proportion to the concentration of the tetramethylbiphenyl-4,4'-dicarboxylate moieties.

Polyesters based on terephthalic acid, particularly polyethylene terephthalate, have been used for the manufacture of fibers and films because of the many desirable properties of the polymer, such as high mechanical strength, low water absorption and resistance to many chemicals. Recently, there has been considerable interest in the use of polybutylene terephthalates in fiberglass molding compositions. In addition to the foregoing, polyethylene terephtalate is being used in large volumes for the production of containers, particularly those suitable for packaging carbonated beverages and various other food products. For this use, the polyethylene terephthalate has the advantage of relatively low permeability to carbon dioxide, low water absorption and low permeability to various other products indigenous to foods.

As pointed out in U.S. Pat. No. 3,535,286, polyethylene terephthalate crystallizes too rapidly for some uses. While the undesirably high crystallization tendency can be reduced by replacing part of the terephthalic acid or the polyhydric alcohol, most of the potential replacement compounds do not substantially improve the undesirable properties of the polymer. Further, such compounds generally reduce the glass transition temperature of the polyalkylene terephthalates and reduce the utility of the polymer. Polyethylene terephthalate (PET) has a relatively high molding temperature of approximately 260°–270° C. and a Tg (glass transition temperature or second order transition temperature) of about 75° C. The relatively low glass transition temperature of the polyester can lead to fusion of polyethylene terephthalate fibers in fabrics during home dryer use or ironing.

The relatively large gradient between the molding temperature of the polymer and the second order transition temperature of the polymer creates several problems in PET molding application. For example, in the production of polyester bottles, polyethylene terephthalate must be molded at a temperature of about 275° C. and then cooled down to about the second order transition temperature prior to orientation to form an oriented (biaxially or monoaxially oriented) bottle. It is generally recognized that the cooling period is the time limiting step in the production of oriented polyethylene terephthalate bottles. Accordingly, there is a need for co-monomers which are capable of lowering the molding temperature of polyethylene terephthalate without adversely affecting the second order transition temperature of the PET polymer. The relatively low second order transition temperature of homopolymeric polyethylene terephthalate prevents the use of this polyester in hot fill applications. Typically, in hot filling, the composition added to the polyester bottle is at a temperature above the second order transition temperature of the PET and during filling the oriented bottle tends to be heated up above its second order transition temperature with the result that orientation is lost and the bottle shrinks on cooling. Accordingly, it is essential to find a means of providing polyethylene terephthalate bottles with higher second order transition temperatures.

Although the crystals of a polymer melt over a temperature range, there is a temperature above which the crystals cannot exist. This temperature is defined as the melting point. Molding temperature or fabrication temperature is defined as the temperature at which the polymer has sufficient flow to be converted to a shaped article. Typically, the molding temperature is higher than the melting point temperature. The second order transition temperature (or Tg) represents the temperature at which the polymer passes from the glassy form into the elastic form and vice versa. In the case of co-polyesters, the molding temperature and Tg temperature generally decrease, and, in the cases where increases are demonstrated, such increases are generally small. Surprisingly, the inclusion of 2,2',6,6'-tetramethylbiphenyl-4,4'-diol as a co-monomer like 2,2'-6,6'-tetramethylbiphenyl-4,4'-dicarboxylic acid as a co-monomer in polyethylene terephthalate polyesters lowers the molding temperature and increases the Tg. This increases the processability of PET. Further, the lower melt temperatures, i.e., requiring less heat input to reach melt temperature, increases the economic utility of PET.

The general object of this invention is to provide a new class of polyesters. Another object of this invention is to provide a new class of non-vicinal benzene dicarboxylate polyesters. Another object of this invention is to provide a new class of terephthalate polyesters having a relatively low molding temperature without reduction of the second order transition temperature of the polymer. Another object of this invention is to provide essentially linear polyethylene terephthalate polyesters having improved physical properties. Other objects appear hereinafter.

In one aspect this invention is directed to a polyester comprising units of a dicarboxylic acid component and dihydroxy component comprising 2,2',6,6'-tetramethylbiphenyl-4,4'-diol moieties.

In a second aspect, this invention is directed to essentially linear co-polyesters comprising terephthalate moieties and dihydroxy component comprising ethylene glycol moieties and 2,2',6,6'-tetramethylbiphenyl-4,4'-diol moieties.

In a third aspect, this invention is directed to polyarylate resins comprising dicarboxylate components comprising at least 80 mole percent non-vicinal benzene dicarboxylate moieties and dihydroxy components comprising at least 80 mole percent of Bisphenol A and 2,2',6,6'-tetramethylbiphenyl-4,4'-diol moieties.

We have now found that the objects of this invention can be attained with copolyesters of dicarboxylate components, particularly those comprising non-vicinal benzene dicarboxylate moieties, and dihydroxy components comprising 2,2',6,6'-tetramethylbiphenyl-4,4'-diol moieties. The essentially linear co-polyesters comprising terephthalate moieties and dihydroxy component comprising ethylene glycol moieties and 2,2',6,6'-tetramethylbiphenyl-4,4'-diol moieties have a lower molding temperature than homopolymeric polyethylene terephthalate and a higher second order transition temperature than homopolymeric polyethylene terephthalate. Accordingly, by replacing a minimum of 5 to 10 mole percent of ethylene glycol moieties with 2,2',6,6'-tetramethylbiphenyl-4,4'-diol moieties, it is possible to produce biaxially oriented PET bottles capable of hot filling uses. For example, when 10 mole percent of ethylene glycol moieties in homopolymeric PET is replaced with 2,2',6,6'-tetramethylbiphenyl-4,4'-diol moieties, the Tg increases from 75° C. to 97° C.

In somewhat greater detail, the preferred polyesters of this invention comprise units of a dicarboxylic acid component comprising non-vicinal benzene dicarboxylate moieties and dihydroxy component comprising 2,2',6,6'-tetramethylbiphenyl-4,4'-diol moieties wherein the non-vicinal benzene dicarboxylate moieties comprise at least 80 mole percent of the dicarboxylate moieties in the polyester and the 2,2',6,6'-tetramethylbiphenyl-4,4'-diol comprises from 5 to 100 mole percent of the diol moieties. Although the non-vicinal benzene dicarboxylic acid component can comprise from 80 to 100 mole percent of the acyl equivalents in the polyesters of this invention, it is preferred that these non-vicinal benzene dicarboxylic acid components comprise at least 95 mole percent of the acyl equivalents in the polyester. In general, substantially all of the non-vicinal benzene dicarboxylate should be terephthalic acid where the final polyester is used in films, fibers and oriented bottles of the type where polyethylene terephthalate is used. On the other hand, in the so-called polyarylate area where the diol component is substantially all aromatic (e.g., 2,2',6,6'-tetramethylbiphenyl-4,4'-diol alone or together with Bisphenol A), the mole ratio of benzene dicarboxylate can range from about 1:9 to 9:1 of isophthalic acid to terephthalic acid. In any case, other suitable acid co-monomers can be present including other aromatic polycarboxylic acids such as phthalic acid, phthalic anhydride, 2,6-naphthalene dicarboxylic acid, 2,2',6,6'-tetramethylbiphenyl-4,4'-dicarboxylic acid, trimellitic anhydride, trimellitic acid, 2,5-dibromoterephthalic acid, etc.; saturated aliphatic polycarboxylic acids containing 2 to 24 carbons atoms such as adipic acid, sebacic acid, 1,2,3,4-butane tetracarboxylic acid, etc.; unsaturated aliphatic dicarboxylic acids such as maleic acid, maleic anhydride, fumaric acid, etc. In those cases where the organic acids or acyl compounds contain three or more acyl groups, the polyacids can comprise up to 2 percent of the acyl equivalents in the polyester and the difunctional organic acids comprise at least 96 to 98 percent. The lower concentration of difunctional organic acids (96 percent) can only be used when monofunctional acids, such as toluic acid or benzoic acid are employed as additional chain terminators. In some less preferred cases, substantially all of the difunctional organic acids can be aliphatic dicarboxylic acids of 4 to 26 carbon atoms.

In those cases where an alpha, beta-ethylenically unsaturated acid compound (maleic anhydride, fumaric acid compound) is used, the resulting polyester can be dissolved in a monovinyl aromatic (styrene, vinyl toluene, etc.) and can be used in coating compositions in the same manner as other unsaturated polyesters.

The 2,2',6,6'-tetramethylbiphenyl-4,4'-diol can comprise from about 5 to 100 mole percent of the hydroxy moieties in the polyester. In those cases where the polyester is a replacement for homopolyethylene terephthalate in films, fibers and oriented bottles, the 2,2',6,6'-tetramethylbiphenyl-4,4'-diol preferably constitutes from about 5 to 30 mole percent of the hydroxy moieties in the polyester with the remainder of the diol components being provided by a straight chain aliphatic saturated glycol of about 2 to 12 carbon atoms, preferably ethylene glycol. In those cases where the polyester is a replacement for typical polyarylate resins, the 2,2',6,6'-tetramethylbiphenyl-4,4'-diol can comprise from 5 to 100 mole percent of the hydroxy moieties in the polyarylate. Typically in these polyarylates, the aromatic diols constitute at least 80 mole percent of the diol moieties. Suitable other aromatic diols for use in the polyarylates include Bisphenol A and hydroquinone.

The various other polyhydric alcohols in this invention include alkylene glycols containing from about 2 to 12 carbon atoms, such as ethylene glycol, 1,3-propylene glycol, 1,2-propylene glycol, butylene glycol, hexamethylene glycol, dodecamethylene glycol, etc.; aromatic polyhydric alcohols, such as hydroquinone, resorcinol, Bisphenol A, etc.; cycloaliphatic glycols such as 1,4-dimethylol cyclohexane; dimethylol cycloaliphatic glycols such as 1,4-dimethylol cyclohexane, dimethylol cyclobutane, etc.; polyoxyalkylene glycols, such as polyoxyethylene glycols, polyoxypropylene glycols, block copolymers of polyethylene and polypropylene glycol, polytetramethylene glycols, etc.; neopentyl glycol, polyhydric alcohols having three or more hydroxy groups, such as 1,1,1-trimethylol ethane, 1,1,1-trimethylol propane, pentaerythritol, sorbitol, reaction products of the aforesaid polyhydric alcohols having a functionality of three or more with alkylene oxides (ethylene oxide or propylene oxide such as those sold for use in the production of flexible polyurethane foams, etc.) In general, the polyhydric alcohols having a functionality of three or more should provide no more than about 2 mole percent of the polyester.

Broadly speaking, the polyesters of this invention can be made by reacting 2,2',6,6'-tetramethylbiphenyl-4,4'-diol alone or together with any other polyhydric alcohol and the appropriate polycarboxylic compound (free polycarboxylic acid, lower alkyl ester of the polycarboxylic acid, polycarboxylic acid acyl halide, diphenyl esters, etc.). The most advantageous combination of reactants depends on the final polymerizate. For example, in those cases where the final polymer is a polyarylate, the polycarboxylic acid derivatives employed are preferably an acyl halide or diphenyl ester. If a polyacyl halide is employed, the polymerization is preferably by interfacial polymerization, whereas if a diphenyl ester is employed, it is by ester interchange. In those cases where the 2,2',6,6'-tetramethylbiphenyl-4,4'-diol is used in conjunction with an alkylene glycol such as ethylene glycol or butylene glycol, it is preferred to react polyhydroxy components with free dicarboxylic acids and/or dimethyl esters of the acids. As indicated above, polyesters of polyarylates can be based upon one or more polycarboxylic acids. If desired, a precondensate of polycarboxylic acid and polyester can be formed prior to the addition of a second polyfunctional monomer (polycarboxylic acid and/or polyhydric alcohol). In any event, the polymerization can be carried out by conventional means well known to those skilled in the art.

The diphenyl esters of non-vicinal benzene dicarboxylic acids can be prepared by reacting one or more non-vicinal benzene dicarboxylic acids (terephthalic acid and/or isophthalic acid) with phenol using a catalyst composition comprising a boron/strong alkali catalyst, such as that disclosed in Ser. No. 057,198, filed July 13, 1979, now U.S. Pat. No. 4,271,311 in the name of Spanswick, et al., which is incorporated by reference, the boron/sulfate catalyst of Lowrance, U.S. Pat. No. 3,772,389, which is incorporated by reference, calcium acetate, polyphosphoric acid, sodium hypophosphite, aluminum phosphate, tridecyl phosphite, aluminum sulfate etc.

EXAMPLE I

To a rapidly agitated solution of 28 g. freshly distilled isophthaloyl chloride dissolved in 800 ml. chloroform in a 5 gallon Waring Blender was added a solution of 33.5 g. 2,2',6,6'-tetramethylbiphenyl-4,4'-diol and 20.0 g. sodium hydroxide dissolved in 1600 ml. water. After two minutes of agitation, the polymerization was essentially complete and 2000 ml. of acetone was added. The solid polyester was filtered, washed with water and dried to give 33.2 g. of polyester having an inherent viscosity of 0.66 dl/g (60/40 phenol/tetrachloroethane at 30° C. and 0.4 g. per 100 ml. concentration).

EXAMPLE II

The process described in Example I was repeated using 12.2 g. isophthaloyl chloride and 4.1 g. terephthaloyl chloride in 400 ml. chloroform and a solution of 19.4 g. 2,2',6,6'-tetramethylbiphenyl-4,4'-diol and 6.7 g. sodium hydroxide in 800 ml. water. Twenty-five and three-tenths grams polyester (85% yield) having an inherent viscosity of 1.00 dl/g was isolated. This polyester had a second order transition temperature of 276° C.

When this example was repeated using approximately 8.2 g. of isophthaloyl chloride and 8.2 terephthaloyl chloride, a polyester having an inherent viscosity of 1.60 dl/g and a second order transition temperature of 288° C. was obtained.

When this example was repeated, except that approximately 16.3 g. isophthaloyl chloride and no terephthaloyl chloride was employed, a polyester having an inherent viscosity of 0.72 dl/g and a second order transition temperature of 275° C. was isolated.

EXAMPLE III

This example illustrates production of a copolyester of this invention under solution polymerization conditions. To a rapidly agitated solution of 16.94 g. 2,2',6,6'-tetramethlbiphenyl-4,4'-diol and 3.12 g. of neopentyl glycol dissolved in 220 ml. dichloromethane and 20.24 g. of triethylamine, there was added 20.3 g. of terephthaloyl chloride in 50 ml. of dichloromethane. After 2 minutes of agitation, the polymerization was essentially complete and the polymer was isolated in the manner described in Example I. The polymer containing a mole ratio of tetramethylbiphenyl diol moieties to neopentyl glycol moieties of 7:3 had an inherent viscosity of 0.97 dl/g. Integration of the proton NMR spectra was consistent with this copolyester structure. TGA showed 1% weight loss at 380° C. Thermal analysis (DSC) also was consistent with this structure.

Essentially the same result can be attained by replacing the neopentyl glycol with ethylene glycol in a molar ratio of from 1:19 to 2,2',6,6'-tetramethylbiphenyl-4,4' diol:ethylene glycol to 19:1.

We claim:

1. A polyester comprising units of a dicarboxylic acid component and dihydroxy component wherein said dicarboxylic acid component comprises non-vicinal benzene dicarboxylate moieties and said dihydroxy component comprises 2,2',6,6'-tetramethylbiphenyl-4,4'-diol moieties.

2. The polyester of claim 1 wherein said 2,2',6,6'-tetramethylbiphenyl-4,4'-diol moieties comprise 5 to 100 mole percent of the dihydroxy component.

3. The polyester of claim 2 wherein said non-vicinal benzene dicarboxylate moieties comprise isophthalate moieties.

4. The polyester of claim 2 wherein said non-vicinal benzene dicarboxylate moieties comprise terephthalate moieties.

5. The polyester of claim 4 wherein the non-vicinal benzene dicarboxylate moieties comprise at least 80 mole percent of the dicarboxylic acid moieties in the polyester.

6. The polyester of claim 5 wherein the dihydroxy component comprises ethylene glycol moieties.

7. The polyester of claim 6 wherein 2,2',6,6'-tetramethylbiphenyl-4,4'-diol moieties comprise about 5 to 30 mole percent of the dihydroxy component moieties in the polyester and the ethylene glycol moieties comprise the remainder.

8. The polyester of claim 1 wherein said dicarboxylic acid component comprises at least 80 mole percent non-vicinal benzene dicarboxylate moieties and said dihydroxy component comprises at least 80 mole percent aromatic diol moieties.

9. The polyester of claim 8 wherein said aromatic diol moieties comprise Bisphenol A moieties.

10. The polyester of claim 8 wherein said dihydroxy component comprises at least 80 mole percent Bisphenol A and 2,2',6,6'-tetramethylbiphenyl-4,4'-diol moieties.

11. A polyester comprising units of a dicarboxylic acid component and dihydroxy component wherein said dihydroxy component comprises 2,2',6,6'-tetramethylbiphenyl-4,4'-diol moieties.

12. The polyester of claim 11 wherein said 2,2',6,6'-tetramethylbiphenyl-4,4'-diol moieties comprise 5 to 100 mole percent of the dihydroxy component.

13. The polyester of claim 12 wherein the dicarboxylic acid component comprises moieties of aliphatic dicarboxylic acid having from 4 to 26 carbon atoms.

* * * * *